May 23, 1933.  C. A. CADWELL  1,911,059
METHOD OF AND APPARATUS FOR ELECTRIC WELDING
Filed Jan. 9, 1930  5 Sheets-Sheet 3
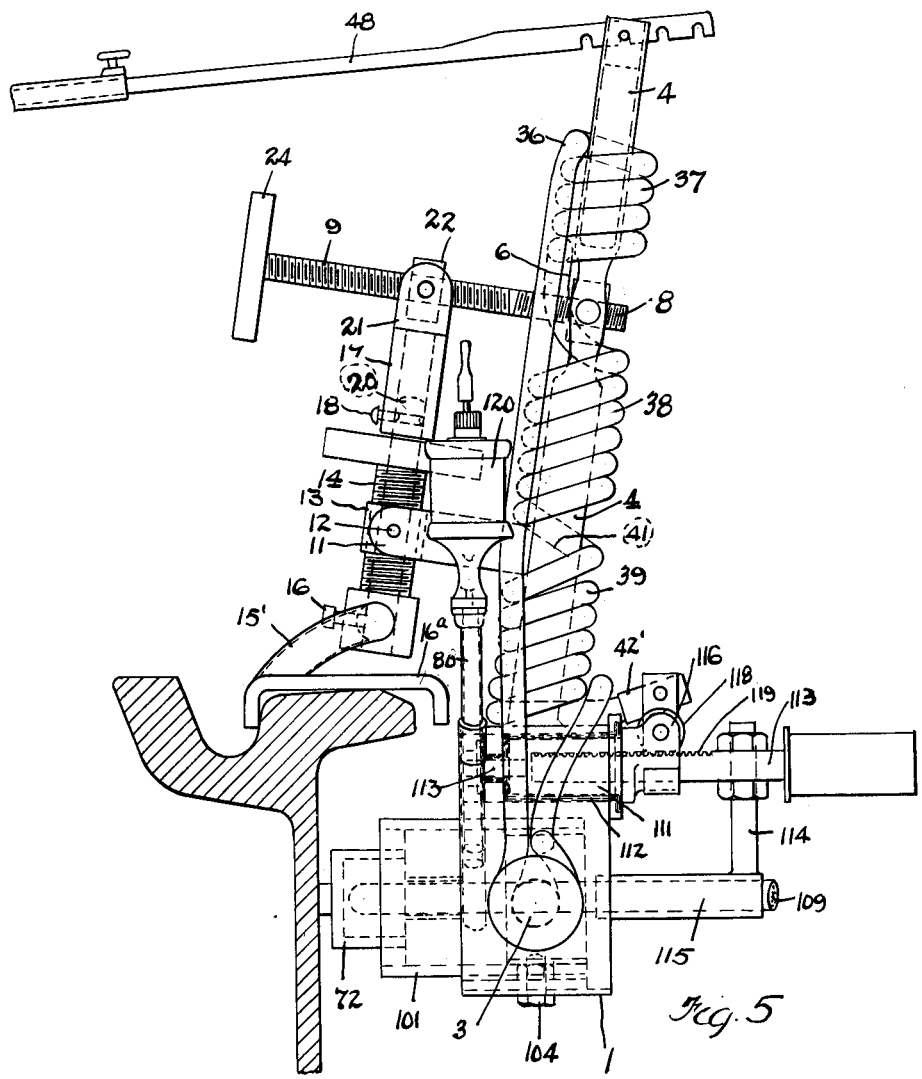
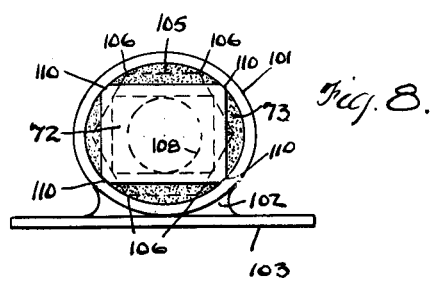
INVENTOR.
Charles A. Cadwell
BY
Fay, Oberlin & Fay
ATTORNEYS.

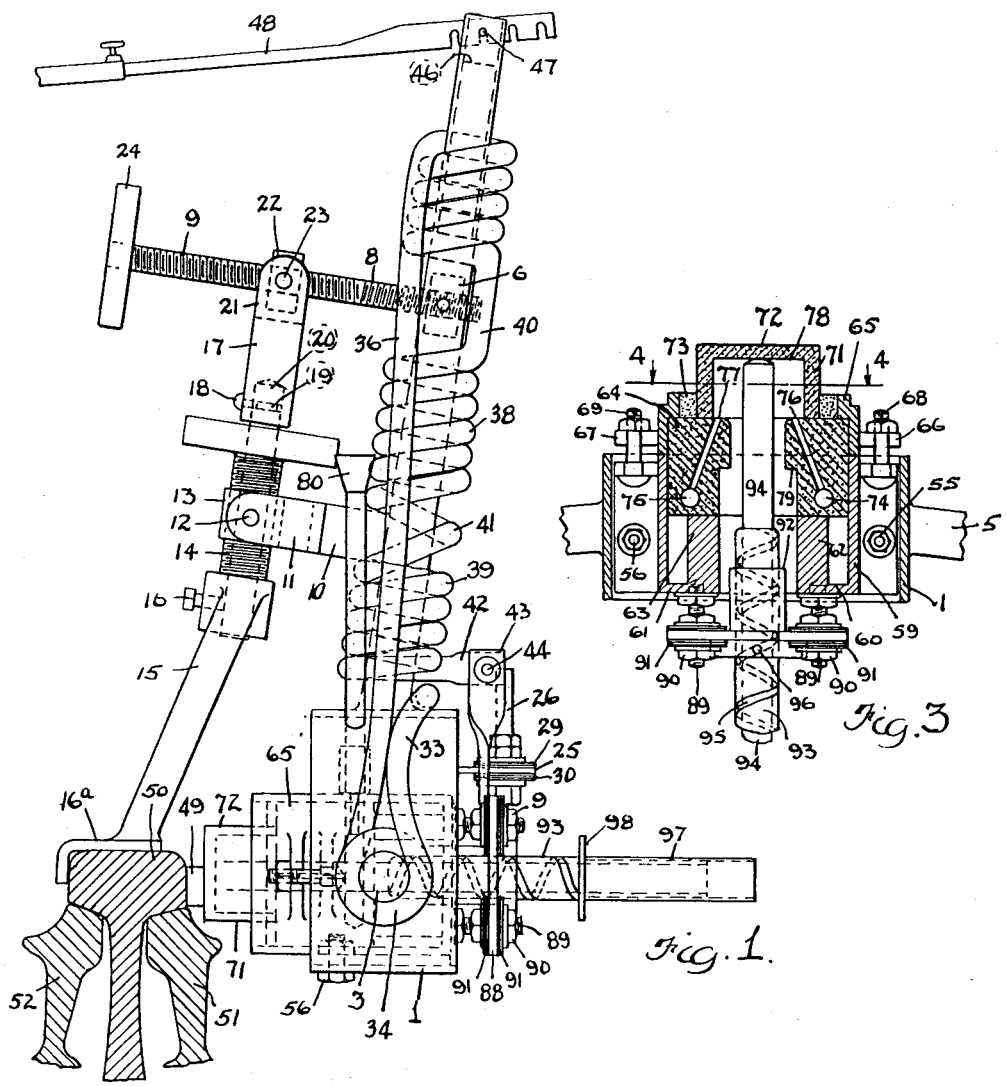

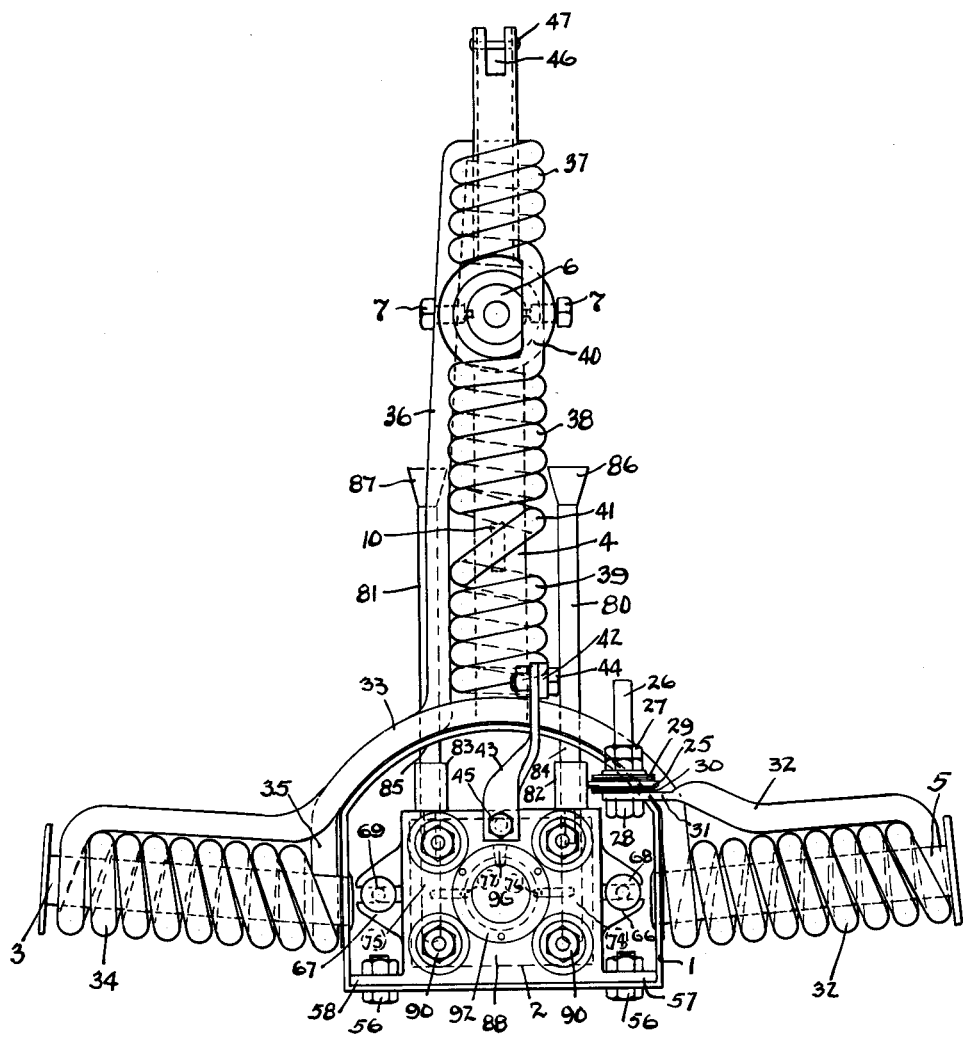
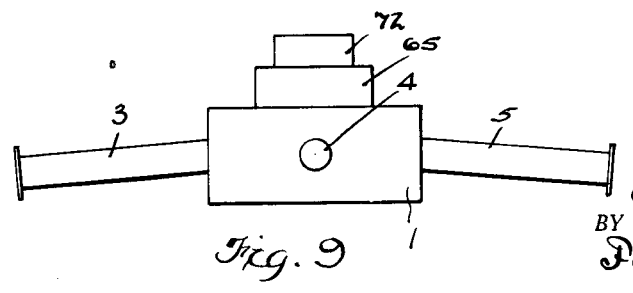

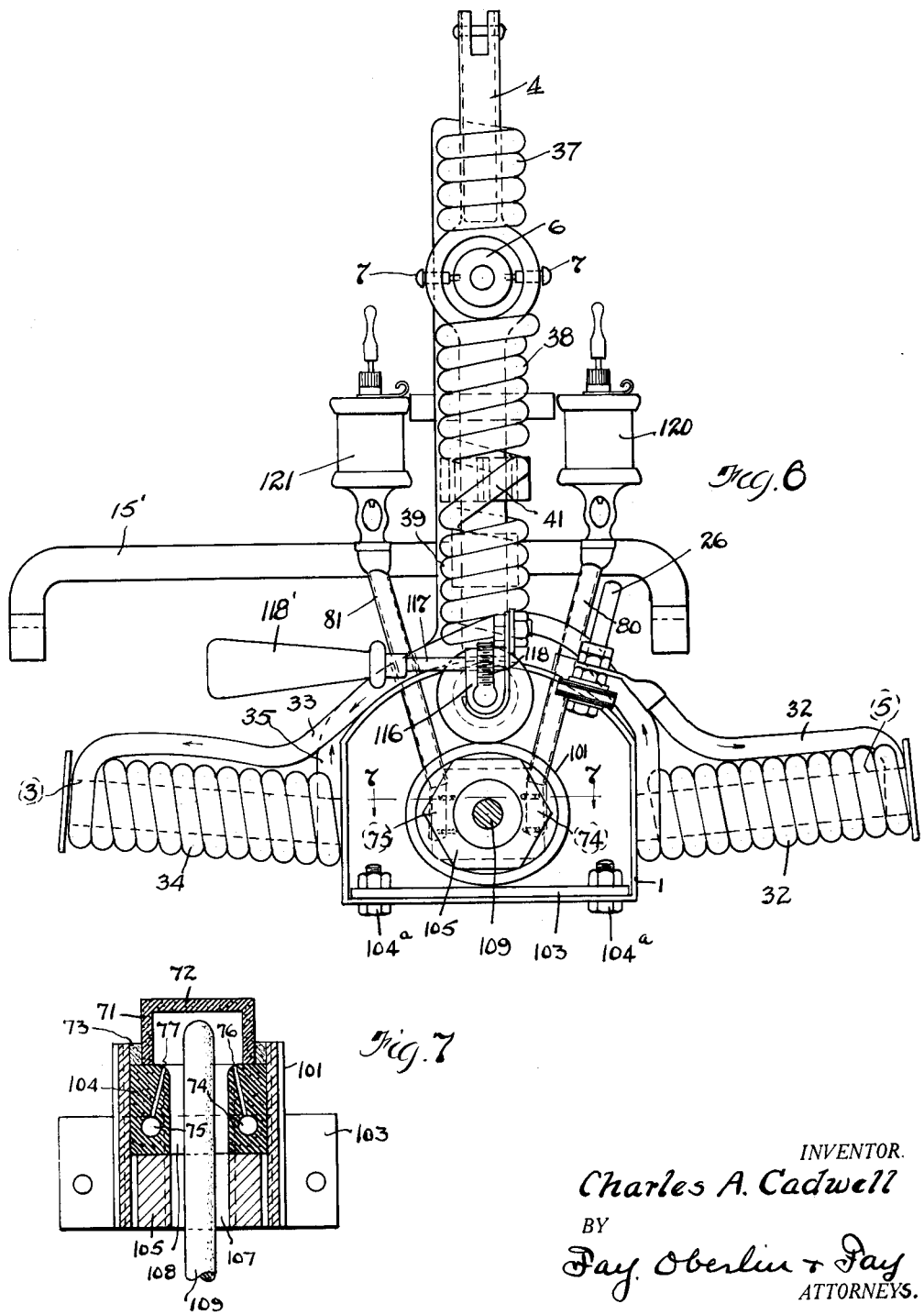

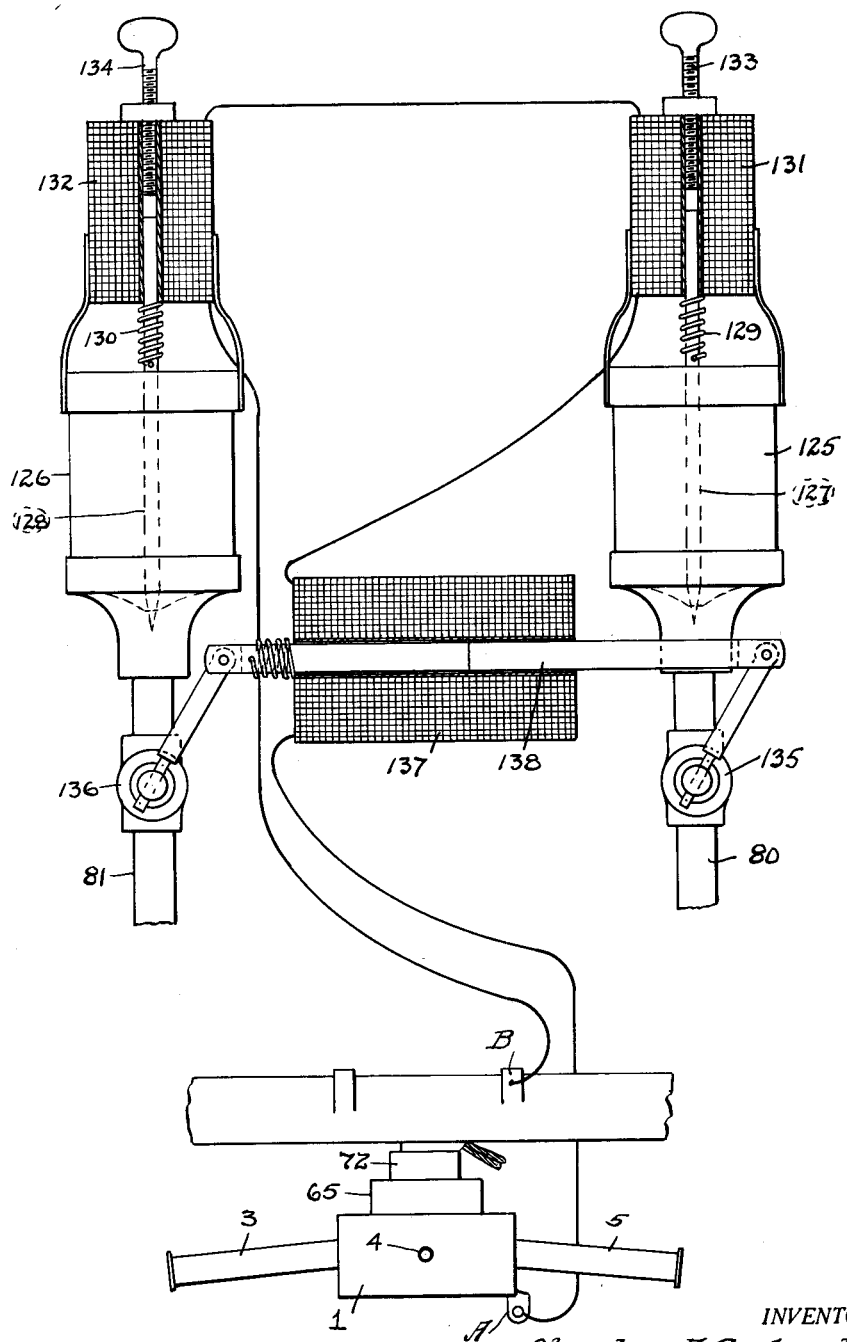

Patented May 23, 1933

1,911,059

UNITED STATES PATENT OFFICE

CHARLES A. CADWELL, OF CLEVELAND HEIGHTS, OHIO, ASSIGNOR TO THE ELECTRIC RAILWAY IMPROVEMENT COMPANY, OF CLEVELAND, OHIO, A CORPORATION OF OHIO

METHOD OF AND APPARATUS FOR ELECTRIC WELDING

Application filed January 9, 1930. Serial No. 419,662.

This invention, relating as indicated to methods of and apparatus for electric welding, has specific reference to methods of and apparatus for electrically welding bonds to rails. The present improved method and apparatus constitute in certain respects an improvement on the method and apparatus disclosed in the patent to Kjellgren and Stephenson No. 1,309,947, dated July 15, 1919. Thus, one of the objects of the present invention is the provision of an apparatus whereby current of relatively high voltage may be utilized so that, for example, in welding rail bonds onto rails, current of the voltage regularly used in the operation of railways may be taken directly from the trolley through a minimum amount of resistance. Heretofore in operations of this sort it has been found necessary to utilize an electrode of high resistance material, bringing the same to the proper high temperature by passing therethrough a current of relatively low voltage and large amperage. By the present process, however, instead of relying upon the resistance of such an electrode I utilize the electric arc which, as is well understood, will require a considerably higher voltage than that just indicated for such resistance electrode.

In employing the electric arc, however, in welding operations, particularly where the bodies are of unlike mass, and where, in addition, there may be a disparity in the temperatures of fusion, the smaller mass, for example, having both the lower temperature of fusion and the greater heat conductivity, an ordinary arc, as is well understood, cannot be successfully employed, as it will fuse or burn such small body long before the contact face of the larger body is brought to a welding temperature; or at least if the parts are welded together at all they are thus united only at a few points instead of uniformly throughout their contacting surface as is desirable, particularly in a rail bonding operation, where the object is to provide an adequate and at the same time permanent electrical connection across the joint between the two rails.

The method commonly employed to utilize an electric arc to accomplish the proper homogeneous connection between the smaller body of relatively soft metal, such as the bond, with the larger body of relatively harder metal, such as the rail, is carried out by pressing a heat-distributing plate against the exposed surface of the terminal portion of the bond and directing the electric arc against this heat-distributing plate which brings about the proper distribution of the heat to effect a weld of high quality. Considerable difficulty has been experienced in the use of the electric arc in this manner since an electric arc is a relatively fine thread of flame of a very high heat intensity. The placing of such an arc against the heat distributing plate would result in a localized area in such plate becoming intensely heated and in many of the disadvantages resulting, which are the undesirable features of the use of the plain arc. Some means must therefore be provided for spreading the arc over the major portion of the heat distributing plate in order to effect a uniform heating of the element to be welded, against which the plate is pressed.

A common method of controlling an electric arc is to provide a solenoid coaxially with the electrode by means of which the arc is struck. The magnetic lines of force as they diverge on leaving the end of the electro-magnetic coil cause the arc to be diffused over the major portion of the heat distributing plate. In order, however, for a solenoid to accomplish the above results such solenoid must be of considerable length in order to effect a proper control over the arc.

In welding bonds to rails the bond of necessity is secured either to the ball of the rail or to the web thereof and in order to effect the heating of the heat-distributing plate as above described, the electrode, by means of which the arc is struck, must extend substantially at right angles to the length of the rail. If the solenoid or electromagnetic coil is to be mounted coaxially with the electrode such construction will, in a great many cases, cause considerable difficulty in the employment thereof in that bridge frame members, dirt fills, side rails, etc., often lie so close to the rail which is to receive the bond that only a relatively short distance is available in which the welding mechanism may be placed.

It is an object of my invention to provide an apparatus for welding bonds on rails and the like, which apparatus shall be capable of being employed in a space which is relatively narrow between the rail which is to receive the bond and any obstruction which may occur adjacent such rail.

The heat energy available at the heat distributing plate is directly proportional to the electrical resistance across the arc gap; this gap is not perpendicular to the distributing plate but the arc thread is the revolving element of a flat cone with the apex at the point of the electrode. The gaseous atmosphere within the arc chamber after becoming heated loses part of its resistance and not only is the useful energy of the arc cut down but the arc travels back away from the point of the electrode and the spread or diffusion of the arc is carried beyond useful limits. Some auxiliary means of maintaining the original conditions within the arc chamber during the period of high temperature will materially assist in the efficient operation of the welding apparatus. It is, therefore, an object of my invention to provide a means whereby the electrical resistance of the atmosphere of the arc chamber can be maintained and the diffusion of the arc over the heat distributing plate may be kept within bounds at all times during the welding operation.

With the necessary intense heat associated with the proper brazing or welding of the bond to the rail and the erosion of the surrounding parts necessarily incidental to the introduction of a resistance maintaining medium to the region of the arc, means must be provided for a ready replacement of the various parts comprising the welding apparatus so that such replacements can be made easily, quickly and without the necessity of entirely disassembling the apparatus. It is a further object of my invention to provide an apparatus which shall have all of the above described advantages. Other objects of my invention will appear as the description proceeds.

To the accomplishment of the foregoing and related ends, said invention, then, consists of the means hereinafter fully described and particularly pointed out in the claims; the annexed drawings and the following description setting forth in detail certain means and one mode of carrying out the invention, such disclosed means and mode illustrating, however, but one of various ways in which the principle of the invention may be used.

In said annexed drawings:—

Fig. 1 is a side elevation of the apparatus comprising my invention shown clamped to a common form of rail; Fig. 2 is a right-side elevation of the apparatus shown in Fig. 1; Fig. 3 is a fragmentary sectional view of the furnace box of the apparatus shown in Figs. 1 and 2; Fig. 4 is a part section part elevation of the furnace box shown in Fig. 3 taken on a plane substantially indicated by the line 4—4; Figs. 5 and 6 are respectively front and side elevations of an alternative form of construction of the apparatus comprising my invention; Fig. 7 is a part section part elevation of the furnace box illustrated in Fig. 6 taken on a plane substantially indicated by the line 7—7; Fig. 8 is an end elevation of the furnace box as shown in Fig. 5, disassociated from the surrounding mechanism; Fig. 9 is a diagrammatic representation showing the relative position of the various parts of the apparatus comprising my invention; and Fig. 10 illustrates diagrammatically a modification in one part of the apparatus.

Referring more specifically to the drawings and more especially to Figs. 1 and 2, the apparatus here disclosed consists of a stirrup-shaped body 1 which has contained therein the furnace box 2 and which has rigidly and magnetically connected thereto the bars 3, 4 and 5. The bar 4 has a trunnion element 6 associated therewith which is secured thereto by means of the bolts 7 and which is adapted to threadedly engage the terminal portion 8 of the screw 9. The bar 4 has also united therewith, and projecting therefrom, the bracket member 10 which has a bifurcated end 11 adapted to secure the pins 12 by means of which the block 13 is oscillatably secured. The block 13 threadably engages the rod 14, which has secured thereto at its lower terminal portion the bracket 15, by means of the set screw 16. The bracket 15 has its lower end 16ª adapted to contact with the wearing surface of the standard form of rail. The rod 14 has oscillatably secured thereto at its upper end a member 17, which is adapted to rotate in a substantially horizontal plane by means of the screw 18 engaging the groove 19 in the pin 20 projecting from the rod 14. The bifurcated end 21 of the member 17 is adapted to oscillatably support the threaded block 22 on the pin 23. The threaded block 22 engages the screw 9 by means of which the position of the apparatus is controlled upon rotation of the screw by the disk-like handle 24.

The stirrup-shaped body member 1 has a bracket 25 rigidly secured thereto, which bracket is adapted to receive the electric lead 26 from the source of electrical supply. The lead 26 is secured to the bracket 25 by the nuts 27 and 28 which maintain the lead insulated from the bracket 25 by means of the insulation material 29 and 30. The nut 28 screws the flattened terminal portion 31 of the insulated lead 32 which is spirally wound on the member 5. The lead 32, after leaving the bar 5, is arched as at 33 over the stirrup-like body member 1 and thence passes to the spiral winding 34 on the bar 3. The terminal portion 35 of the lead, after it leaves the spiral windings 34 on the bar 3, passes, as at 36, to the upper portion of the bar 4 where it is formed into a plurality of spiral windings 37, 38 and 39, which are interconnected by means of the portions 40 and 41, these portions being so adapted as not to interfere with the screw 9 and the bracket 10 by which the bar 4 is supported. The terminal portion 42 of the above described lead is secured to the bracket 43 by means of the bolt 44, which bracket is in turn secured to the furnace box 2 by means of the bolt 45.

It will be seen that the bars 3, 4 and 5, which are magnetically connected to the stirrup-formed body member 1, are, by means of the leads wound thereon, transformed into electric magnets. The welding current which passes through these leads is therefore utilized to effect a control of the arc in the manner hereinafter more fully explained.

The terminal portion of the bar 4 is bifurcated as at 46 and adapted to secure the pin 47, which in turn secures the brace 48 which is fastened to the opposite rail of the tracks. The furnace box is caused to bear against the terminal portion 49 of the rail bond which is to be welded to the rail 50. The rail 50 has here shown associated therewith the plates 51 and 52, by means of which adjacent rails are connected. The proper pressure of the apparatus on the bond portion 49 is controlled by means of the screw 9 and as the bond is heated the rotation of the entire apparatus in a horizontal plane through the members 18, 19 and 20 as hereinbefore described, permits the apparatus to adjust itself with respect to inclinations in the surface of the bond portion 49, either before such portion becomes heated or after heating when the surface thereof may become tapered.

The furnace box 2, most clearly shown in Fig. 3, is secured to the foot rest portion of the stirrup frame 1 by means of the bolts 55 and 56, which respectively pass through apertures formed therefor in the laterally extending flanges 57 and 58. The furnace box proper is substantially rectangular in form and consists of a main body 59, which has inwardly directed flanges 60 and 61 formed integrally therewith, which flanges support the central members 62 and 63. The body member 59 is adapted to receive a block 64, preferably of some refractory material such as graphite, which block is secured in the furnace box by means of the securing frame 65, which has integrally formed therewith lugs 66 and 67 adapted to receive the bolts 68 and 69, by means of which the frame member 65 and the body member 59 are united.

The frame supporting member 65 has a substantially elliptical aperture 70 formed centrally thereof in its forward end, which aperture is adapted to receive the rectangular flange 71 which is formed as a skirt around the heat distributing plate 72. The skirt 71 contacts only at its corners with the elliptical aperture 70 and the spaces between such skirt and the frame supporting member 65 is filled with a suitable plastic cement 73, such as fire clay and the like, which secures the heat distributing plate 72 with respect to the metallic body of the furnace box and likewise furnishes a suitable heat insulating means for protecting the metallic portion of the furnace.

The block 64 has fluid wells 74 and 75 formed therein, which wells extend substantially vertically in the normal position of the apparatus and which have fluid ducts 76 and 77, respectively leading therefrom to the substantially closed chamber 78 formed by the heat distributing plate 72, its supporting skirt 71 and the inwardly directed flange 79 of the block 64. The fluid wells 74 and 75, as most clearly shown in Fig. 2, have positioned thereon the tubular members 80 and 81, respectively, which tubular elements are in turn supported by the cylindrical projections 82 and 83 rigidly secured to the body member 59. The tubular elements 80 and 81 pass through apertures 84 and 85, respectively formed therefor in the upper portion of the stirrup-formed shell 1, and have their terminal portions formed into flared ends 86 and 87, respectively.

The body member 59 supports the insulated plate 88, as most clearly shown in Figs. 1 and 3, which plate is secured by the bolts 89 and the nuts 90. The plate 88 is separated from the nuts 90 and the bolts 89 by means of the insulating material 91. The plate 88 is centrally adapted to support the tubular member 92 which in turn supports the electrode holder 93. The electrode holder 93, which frictionally secures the electrode 94 has a helical groove 95 formed in the periphery thereof, which groove coacts with the pin 96 carried by the rigidly mounted tubular member 92 so that upon rotation of the electrode holder the electrode is moved axially in a direction depending upon the rotation of the holder. The electrode holder 93 has secured to its terminal portion a sheath of insulating material 97 and the circumferential flange 98 which permits such holder to be actuated by the hand of the operator.

The alternative form of the construction of the apparatus comprising my invention, as illustrated in Figs. 5 to 8, inclusive, is in general identical with the construction just described. For the parts in this construction which correspond to the parts in the construction just described like reference ordinals will therefore be applied to simplify the description. Only so much of this alternative form of construction as is different from the construction just described will be further dealt with.

The means by which the entire mechanism is supported on the rails is similar to that just described, attention, however, being directed to the form of the bracket 15' which, as shown in Fig. 6, is formed with a greater length on the side normally occupied by the operator of the mechanism to permit the operator easier access to the bond which is to be welded to the rail. The general arrangement of the substantially radially extending bars 3, 4 and 5 is the same in both constructions and the arrangement of the electrical conduit thereon is identical with the exception of the terminal portion 42', which is in this form of construction shown attached to the body of the furnace in a somewhat different manner.

The stirrup-shaped body frame 1 is of the same form as that before described, but the construction of the furnace box contained therein is different to the extent requiring a separate detail description. The supporting body 101 of the furnace box is substantially elliptical in cross-section and is secured by welding or like means as at 102 to the substantially flat base 103. The base 103 is removably secured to the foot plate of the stirrup frame 1 by means of the bolts 104ª. The elliptical body 101 of the furnace box, as most clearly shown in Fig. 7, has a similarly formed block 104, preferably of refractory material, secured therein, which block is supported by a hexagonal metallic member 105 which is welded or otherwise rigidly secured to the elliptical body 101 at the corners 106. The hexagonal member 105 and the block 104 have apertures 107 and 108, respectively, formed therein adapted to receive the electrode 109. Positioned on the block 104 is the heat distributing plate 72 which is supported by the depending skirt 71 and which contacts with the elliptical body 101 only at the corners 110. The intervening space between the skirt 71 and the elliptical body 101 is filled with a plastic cement 73, such as fire clay, which serves as a heat insulating means between the heat distributing plate 72 and the metallic body 101.

The stirrup-formed body 1 has rigidly supported therein the tubular supporting means 111 which is electrically insulated from the stirrup body by means of the insulating material 112 and is secured thereto by means of the bolt 113. The tubular member 111 is centrally adapted to receive the terminal portion of the toothed member 113, which has rigidly secured thereto the depending arm 114. The depending arm 114 is integrally united with the electrode holder 115, which frictionally engages the electrode 109. The tubular member 111 has integrally united therewith the bracket 116 which is adapted to revolubly support the terminal portion 117 of the adjusting handle 118. The cylindrical portion 117 has rigidly mounted thereon the gear 118 which intermeshes with the toothed portion 119 of the member 113. By rotating the handle 118' the member 113 can be caused to slide in and out of the tubular member 111, and axial adjustment of the electrode 109 with respect to the heat distributing plate 72 is in this manner effected.

The block 104 has fluid wells 74 and 75 formed therein, which have leading therefrom the ducts 76 and 77 in the manner hereinbefore explained in connection with the first described construction. The tubular members 80 and 81 are in Fig. 6 shown adapted with feed cups 120 and 121, by means of which the flow of fluid to the wells can be controlled. The general operation of this alternative form of construction is the same as that of the first form described, and the operation of the first described apparatus will now be briefly explained.

Fig. 9 is a diagrammatic plan view of the apparatus in which the various parts are shown by conventional representations in order to clearly show the general structure of the entire apparatus. The arms 3, 4 and 5, which are connected to the stirrup-formed body 1 are here shown to be so placed as to permit the apparatus to be placed in a relatively small space adjacent the rail to which the bond is to be welded. The heat distributing plate 72 and the frame supporting member 65 (which might be the electrical member 101) are shown diagrammatically projecting from the body 1 of the apparatus and, so projecting, directed against the bond terminal to be welded.

The apparatus is positioned on the rail as shown in Fig. 1, the bond terminal 49 properly positioned with respect to the rail 50 and the heat distributing plate 72 and the entire apparatus then rigidly secured in place by means of the brace 48 and the proper pressure exerted by means of the screw 9. The lead 26 is then connected to a suitable source of electric current and the electrode 94 moved forward toward the heat distributing plate 72 until electrical contact is established, whereupon current will flow through the entire circuit. By means of the electrode holder 93 or 115 the electrode is then retracted from the plate 72 and the arc struck. A suitable fluid, such as water, is then introduced to the fluid wells 74 and 75, either by means of the sight cups as illustrated in Figs. 5 and 6 or through the flared ends 86 and 87 as shown in Fig. 2, which fluid, when the block 64 or 104 is sufficiently heated, will pass through the ducts 76 and 77 provided therefor into the substantially closed chamber 78. The effect of the welding current passing through the leads wound on the rods 3, 4 and 5 is to set up a magnetic field which causes the arc to be spread over the major portion of the inner face of the heat distributing plate 72. This spreading of the arc by the magnetic field is assisted by the vapor ejected by the ducts 76 and 77, and a further effect of the vapor leaving these ducts is to maintain the effect of the arc against the inner surface of the heat distributing plate.

Instead of utilizing the simple wells 74 and 75 with flared or funnel ends 86 and 87 (Fig. 2), or the tubes 80 and 81 with feed cups 120 and 121 (Fig. 6), through which to introduce water or equivalent fluid into the closed chamber 78, I may employ automatic, preferably magnetically controlled, water supply means such as shown for example in Fig. 10. Such magnetic control depends upon the observed fact that the introduction of water into the chamber 78 increases the voltage across the arc and that the heating may be held at a high intensity by adding additional water as such voltage drops to any predetermined value. Accordingly, in the device illustrated in Fig. 10, water reservoirs 125 and 126 take the place of the flared or funnel ends on the wells 80 and 81 of the apparatus illustrated in Figs. 1 and 2 or the equivalent tubes 80 and 81 of the modified form of the apparatus illustrated in Figs. 5 and 6. The escape of the water in said reservoirs is normally prevented by needle valves 127 and 128 which are held to their seats by springs 129 and 130, respectively. Associated with the respective stems of such valves are solenoids 131 and 132 which when energized are adapted to withdraw the valves from their seats, the amount of such withdrawal being regulated by adjustable stops 133 and 134.

In addition to valves 127 and 128 just described, plug valves or stop cocks 135 and 136 are provided in the wells or tubes below the reservoirs 125 and 126, respectively, such last mentioned valves being arranged for conjoint operation by means of a third solenoid 137, the core 138 of which is operatively connected with said valves as shown. All three solenoids are connected in series in a shunt circuit from points A and B on the welder and rail being welded, respectively, the arrangement being such that as needle valves 127 and 128 open, the valves 135 and 136 close with the closing of the circuit; however, as the voltage across points A and B of the apparatus begins to drop, the valves open in proportion to the drop and allow water to flow accordingly. Adjustments of solenoid action are made by varying the stops 133 and 134 as well as by varying the tension of the several springs employed in connection with the valves and by selecting proper windings for the solenoids themselves, all as will be readily understood.

The vapor upon entering the region of the arc renews the atmosphere of the chamber in such manner as to maintain the electrical resistance and to limit the spread of the arc on the heat distributing plate 72 as well as to blow the arc forward against the heat distributing plate.

The construction and arrangement of the various parts as illustrated in Fig. 3 permits of a ready disassembly of the furnace box and a quick replacement of parts which is particularly advantageous when repairs are to be made in the field, as is usually the case.

The arrangement of parts 3, 4 and 5, which with the stirrup-formed shell with which they are magnetically connected, establishes substantially the same resulting electromagnetic field around the electrode and the same distribution of the arc over the inner surface of the heat distributing plate 72 is effected as when a solenoid, co-axially mounted with such electrode, is employed. The advantage of this type of construction is that there are no parts which project for a substantial distance at right angles to the rail which would be interfered with by guard rails, embankments and the like. The apparatus and the method herein disclosed accomplish a distribution of the arc over the surface of the heat distributing plate as well as an augmentation of the heat supplied by the electric arc in a manner not possible with any of the apparatus or methods now in use.

Other modes of applying the principle of my invention may be employed instead of the one explained, change being made as regards the process herein disclosed, provided the step or steps stated by any of the following claims or the equivalent of such stated step or steps be employed.

I therefore particularly point out and directly claim as my invention:—

1. In apparatus of the character described, the combination of a heat distributing plate adapted to contact with the surface to be heated; means for directing an arc against said plate; and means for spreading such arc over the surface of said plate, said means including an electro-magnetic coil disposed with its axis substantially normal to such arc; and a core for said coil.

2. In apparatus of the character described, the combination of a heat distributing plate adapted to contact with the surface to be heated; means for directing an arc against said plate; and means for spreading such arc over the surface of said plate, said means including plural spaced electro-magnetic coils extending substantially radially from said arc; and cores for said coils.

3. In apparatus of the character described, the combination of a heat-distributing plate adapted to contact with the surface to be heated; means for directing an arc against said plate; and means for spreading such arc over the surface of said plate, said means including a metallic shell disposed with its axis in substantial alignment with such arc, an electro-magnetic coil disposed with its axis substantially normal with such arc; and a core for said coil in magnetic contact with said shell.

4. In apparatus of the character described, the combination of a heat-distributing plate adapted to contact with the surface to be heated, means for directing an arc against said plate; and means for spreading such arc over the surface of said plate, said means including a metallic shell disposed with its axis in substantial alignment with such arc; plural spaced electro-magnetic coils extending substantially radially from said arc; and cores for said coils in magnetic contact with said shell.

5. In apparatus of the character described, the combination of a heat-distributing plate adapted to contact with the surface to be heated; means for directing an arc against said plate; and means for spreading such arc over the surface of said plate, said means including means for supplying a directed stream of fluid to such arc.

6. In apparatus of the character described, the combination of a heat-distributing plate adapted to contact with the surface to be heated, said plate forming one side of a substantially closed chamber, means for directing an arc in said chamber against said plate, means for spreading such arc over the surface of said plate, and means for supplying vapor to said chamber.

7. In apparatus of the character described, the combination of a heat-distributing plate adapted to contact with the surface to be heated, said plate forming one side of a substantially closed chamber, means for directing an arc against said plate; means for spreading such arc over the surface of said plate, and means for supplying a directed stream of fluid into said chamber to such arc.

8. In apparatus of the character described, the combination of a heat-distributing plate adapted to contact with the surface to be heated, said plate forming one side of a substantially closed chamber, means for directing an arc against said plate; means for spreading such arc over the surface of said plate; and means for supplying a directed stream of vapor to such arc in said chamber.

9. In apparatus of the character described, the combination of a heat-distributing plate adapted to contact with the surface to be heated, said plate forming one side of a substantially closed chamber, means for directing an arc against said plate; means for spreading such arc over the surface of said plate; and means for supplying a stream of fluid to such chamber in substantial alignment with and directed toward the axis of said arc.

10. In apparatus of the character described, the combination of a heat-distributing plate adapted to contact with the surface to be heated; said plate forming one side of a substantially closed chamber, means for directing an arc against said plate; means for spreading such arc over the surface of said plate; and means for supplying a plurality of circumferentially spaced streams of fluid to such chamber in substantial alignment with and directed toward the axis of said arc.

11. In apparatus of the character described, the combination of a heat distributing plate adapted to contact with the surface to be heated; means for directing an arc against said plate; means for spreading such arc over the surface of said plate, said means including an electro-magnetic coil disposed with its axis substantially normal to such arc; a core for said coil; and means for supplying directed streams of fluid to such arc at acute angles to the axis thereof.

12. In apparatus of the character described, the combination of a heat-distributing plate adapted to contact with the surface to be heated; means for directing an arc against said plate; means for spreading such arc over the surface of said plate, said means including a plurality of elctro-magnetic coils arranged with their axes extending radially from the axis of the arc; cores for said coils; and means for supplying a directed stream of fluid to such arc.

13. In apparatus of the character described, the combination of a heat-distributing plate adapted to contact with the surface to be heated; means for directing an arc against said plate; means for spreading such arc over the surface of said plate, said means including a metallic shell disposed with its axis in substantial alignment with such arc; an electro-magnetic coil disposed with its axis substantially normal with such arc; a core for said coil in magnetic contact with said shell; and means for supplying a directed stream of fluid to such arc.

14. In apparatus of the character described, the combination of a heat-distributing plate adapted to contact with the surface to be heated; means for directing an arc against said plate; means for spreading such arc over the surface of said plate, said means including a metallic shell disposed with its axis in substantial alignment with such arc; a plurality of spaced electro-magnetic coils disposed with their axes substantially normal to the axis of such arc; cores for said coils in magnetic contact with said shell; and means for supplying a directed stream of fluid to such arc.

15. In apparatus of the character described, the combination of a heat-distributing plate adapted to contact with the surface to be heated; means cooperating with said plate to form a substantially closed chamber, means for directing an arc against said plate;

and means for supplying a resistance maintaining medium to such arc.

16. In an apparatus of the character described, the combination of a heat-distributing plate adapted to contact with the surface to be heated; means cooperating with said plate to form a substantially closed chamber, means for directing an arc against said plate; means for spreading such arc over the surface of said plate; and means for supplying a resistance maintaining medium to such arc.

17. In an apparatus of the character described, the combination of a heat-distributing plate adapted to contact with the surface to be heated; means cooperating with said plate to form a substantially closed chamber, means for directing an arc against said plate; and means for supplying a fluid to such arc to augment and control the temperature imparted to said plate.

18. In an apparatus of the character described, the combination of a heat-distributing plate adapted to contact with the surface to be heated; means for directing an arc against said plate; a substantially closed chamber for confining such arc; and means for supplying a fluid to such chamber.

19. In an apparatus of the character described, the combination of a heat-distributing plate adapted to contact with the surface to be heated; means for directing an arc against said plate; a substantially closed chamber for confining such arc; and means for maintaining the electrical resistance of such arc, said means including means for supplying fluid to said chamber.

20. In apparatus of the character described, the combination of a heat-distributing plate adapted to contact with the surface to be heated, an axially adjustable electrode for directing an arc against said plate, refractory means surrounding said electrode to form with said plate a substantially closed chamber, means for supporting said plate and said refractory means, and means for effecting axial adjustment of said electrode including a supporting sleeve, a holder for said electrode, and a pin on one of said last named members engaging a helical groove on the other of said members.

21. In apparatus of the character described, the combination of a heat-distributing plate adapted to contact with the surface to be heated, an axially adjustable electrode for directing an arc against said plate, refractory means surrounding said electrode to form with said plate a substantially closed chamber, means for supporting said plate and said refractory means, electrically insulated means secured to said supporting means for supporting said electrode, and means associated with said insulated means for axially adjusting said electrode.

22. In apparatus of the character described, the combination of a heat-distributing plate adapted to contact with the surface to be heated, an axially adjustable electrode for directing an arc against said plate, refractory means surrounding said electrode to form with said plate a substantially closed chamber, fluid wells in said refractory means, fluid ducts from said wells to said chamber, means for supporting said plate and said refractory means, and means for effecting axial adjustment of said electrode.

23. In apparatus of the character described, the combination of a heat-distributing plate adapted to contact with the surface to be heated, an axially adjustable electrode for directing an arc against said plate, refractory means surrounding said electrode to form with said plate a substantially closed chamber, means for supporting said plate and said refractory means, means for supporting said electrode, an electrode holder, helical grooves in said holder, and means associated with said electrode supporting means adapted to coact with said helical groove to effect axial adjustment of said electrode.

24. In apparatus of the character described, the combination of a heat-distributing plate having a peripheral flange, refractory means for supporting said plate, metallic supporting means securing said plate and said refractory means, a body member adapted to receive said refractory means and removably secure said metallic supporting means, an electrode for directing an arc against said plate, and means associated with said body member for supporting and effecting axial adjustment of said electrode.

25. In a method of uniting contacting metal bodies, the steps which consist in pressing a heat-distributing shield against the exposed face of one of such bodies, directing an arc against the face of such shield opposite to that face in contact with such metal body, and introducing a stream of fluid to such arc to limit the spread of the same over the major portion of such shield.

26. In a method of uniting contacting metal bodies, the steps which consist in pressing a heat-distributing shield against the exposed face of one of such bodies, directing a laterally confined arc against the face of such shield opposite to that face in contact with such metal body, and supplying a resistance increasing fluid to such arc.

27. In a method of uniting contacting metal bodies, the steps which consist in pressing a heat-distributing shield against the exposed face of one of such bodies, directing an arc against the face of such shield opposite to that face in contact with such metal body, and introducing a stream of fluid to such arc to spread the same over the major portion of such shield and to maintain constant the resistance of such arc.

28. In a method of uniting contacting metal bodies, the steps which consist in pressing a heat-distributing plate against the exposed face of one of such bodies, directing an arc against the face of such plate opposite to that face in contact with such metal body, and introducing a plurality of directed diametrically opposed streams of fluid to such arc to spread the same over the major portion of said plate and to maintain constant the resistance of such arc.

29. In a method of homogeneously uniting a copper bond to a rail, the steps which consist in placing a heat-distributing plate against the exposed face of the bond terminal, directing an arc against the face of said plate opposite to that face in contact with such metal body, and introducing a plurality of directed diametrically opposed streams of fluid to such arc to spread the same over the major portion of said plate and to maintain constant the resistance of such arc.

30. In a method of homogeneously uniting a copper bond to a rail, the steps which consist in placing a heat-distributing plate against the exposed face of the bronze sheathed bond terminal, directing an arc against the face of said plate opposite to that face in contact with such metal body, and introducing a stream of fluid to such arc to spread the same over the major portion of to spread the same over the major portion of such shield and to maintain constant the resistance of such arc.

31. In apparatus of the character described, a substantially closed chamber, a heat-distributing plate forming one wall of said chamber and adapted to contact with the surface to be heated, means for directing an arc in said chamber against said plate, and means for introducing water into said chamber to increase the heating effect of the arc.

32. In apparatus of the character described, a substantially closed chamber, a heat-distributing plate forming one wall of said chamber and adapted to contact with the surface to be heated, means for directing an arc in said chamber against said plate, and means for supplying water-vapor to said chamber.

Signed by me, this 2nd day of January, 1930.

CHARLES A. CADWELL.